(12) United States Patent
Gross

(10) Patent No.: US 10,829,050 B2
(45) Date of Patent: Nov. 10, 2020

(54) MULTI-FUNCTIONAL EXTERIOR MIRROR WITH INTEGRATED CAMERA

(71) Applicant: Gentex Corporation, Zeeland, MI (US)

(72) Inventor: Michael A. Gross, Baden-Wuerttemberg (DE)

(73) Assignee: GENTEX CORPORATION, Zeeland, ME (US)

( * ) Notice: Subject to any disclaimer, the term of this patent is extended or adjusted under 35 U.S.C. 154(b) by 0 days.

(21) Appl. No.: 16/408,832

(22) Filed: May 10, 2019

(65) Prior Publication Data

US 2019/0359140 A1 Nov. 28, 2019

Related U.S. Application Data

(60) Provisional application No. 62/676,039, filed on May 24, 2018.

(51) Int. Cl.
*B60R 1/12* (2006.01)
*B60R 1/072* (2006.01)

(52) U.S. Cl.
CPC .............. *B60R 1/12* (2013.01); *B60R 1/072* (2013.01); *B60R 2001/1253* (2013.01)

(58) Field of Classification Search
CPC ........ G06K 9/629; H04N 5/2351; B60R 1/12; B60R 1/025; B60R 1/06
See application file for complete search history.

(56) References Cited

U.S. PATENT DOCUMENTS

| | | | | |
|---|---|---|---|---|
| 5,786,772 A | * | 7/1998 | Schofield | .......... B60R 21/01564 340/903 |
| 6,111,683 A | * | 8/2000 | Cammenga | .......... B60Q 1/2665 340/468 |
| 7,722,199 B2 | * | 5/2010 | DeWard | .................... B60R 1/04 248/481 |
| 8,237,909 B2 | | 8/2012 | Ostreko et al. | |
| 8,411,245 B2 | | 4/2013 | Lee et al. | |
| 2002/0003571 A1 | * | 1/2002 | Schofield | .................. B60R 1/00 348/148 |
| 2008/0012942 A1 | * | 1/2008 | Kawamura | .......... H04N 5/2352 348/164 |
| 2008/0049344 A1 | * | 2/2008 | DeWard | .................... B60R 1/04 359/877 |
| 2010/0232045 A1 | * | 9/2010 | DeWard | .................... B60R 1/04 359/843 |
| 2015/0078661 A1 | * | 3/2015 | Granados | ................ G06T 5/009 382/167 |

(Continued)

FOREIGN PATENT DOCUMENTS

EP 2465729 A1 6/2012

*Primary Examiner* — Paulos M Natnael
(74) *Attorney, Agent, or Firm* — Price Heneveld LLP; Bradley D. Johnson

(57) ABSTRACT

A multi-purpose exterior mirror module for a vehicle comprising an image sensor configured to capture image data and a reflective surface disposed on a side portion. A housing is configured to support the reflective surface and the image sensor in connection with the vehicle. An actuator is configured to adjust an orientation of the reflective surface about an adjustment axis. A controller is in communication with the image sensor and the actuator. The controller is configured to control the actuator to adjust an orientation of the reflective surface about the adjustment axis.

16 Claims, 3 Drawing Sheets

(56) References Cited

U.S. PATENT DOCUMENTS

| | | |
|---|---|---|
| 2015/0097955 A1 | 4/2015 | De Wind et al. |
| 2017/0064175 A1* | 3/2017 | Furutake ............ G06K 9/00798 |
| 2018/0251069 A1* | 9/2018 | LaCross ................... B60R 1/12 |
| 2019/0149712 A1* | 5/2019 | Katsuyama ........ G06K 9/00825 |
| | | 348/148 |

* cited by examiner

MULTI-FUNCTIONAL EXTERIOR MIRROR WITH INTEGRATED CAMERA

CROSS-REFERENCE TO RELATED APPLICATION

This application claims the benefit under 35 U.S.C. § 119(e) of U.S. Provisional Patent Application No. 62/676,039, filed May 24, 2018, entitled "MULTI-FUNCTIONAL EXTERIOR MIRROR WITH INTEGRATED CAMERA," which is incorporated herein by reference in its entirety.

TECHNOLOGICAL FIELD

The present invention generally relates to an exterior mirror for a vehicle and, more particularly, relates to a mirror module for a vehicle with an integrated imaging device.

BRIEF SUMMARY

In one aspect of the disclosure, a multi-purpose exterior mirror module for a vehicle is disclosed. The module comprises an image sensor configured to capture image data and a reflective surface disposed on a side portion. A housing is configured to support the reflective surface and the image sensor in connection with the vehicle. An actuator is configured to adjust an orientation of the reflective surface about an adjustment axis. A controller is in communication with the image sensor and the actuator. The controller is configured to control the actuator to adjust an orientation of the reflective surface about the adjustment axis.

In another aspect of the disclosure, a method for controlling an exterior mirror assembly for a vehicle is disclosed. The method comprises orienting the mirror assembly in a first orientation about an adjustment axis and exposing a first surface of the mirror assembly in an airflow direction generated by a forward motion of the vehicle. The method further comprises controlling a rotation of the mirror assembly by at least 60 degrees about the adjustment axis in a second orientation and exposing a second surface of the mirror assembly in the airflow direction generated by the forward motion. The second surface comprises a frontal area at least 10 percent smaller than the first surface.

In yet another aspect of the disclosure, an exterior mirror module for a vehicle is disclosed. The module comprises an image sensor configured to capture image data and a mirror assembly comprising a housing configured support a reflective element and the image sensor. An actuator is configured to adjust an orientation of the mirror assembly relative to the vehicle about an adjustment axis. A controller is in communication with the image sensor and the actuator. The controller is configured to control the actuator to adjust an orientation of the reflective element about the adjustment axis from a first orientation to a second orientation. The first orientation comprises a first surface of the mirror assembly oriented as a frontal surface relative to a forward operation of the vehicle. The second orientation comprises a second surface of the mirror assembly oriented as the frontal surface. The second surface comprises a reduced drag coefficient relative to the first surface.

These and other features, advantages, and objects of the present invention will be further understood and appreciated by those skilled in the art by reference to the following specification, claims, and appended drawings.

DETAILED DESCRIPTION

It is to be understood that the invention disclosed herein may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The terms "including," "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises a . . . " does not, without more constraints, preclude the existence of additional identical elements in the process, method, article, or apparatus that comprises the element.

Figure 1:
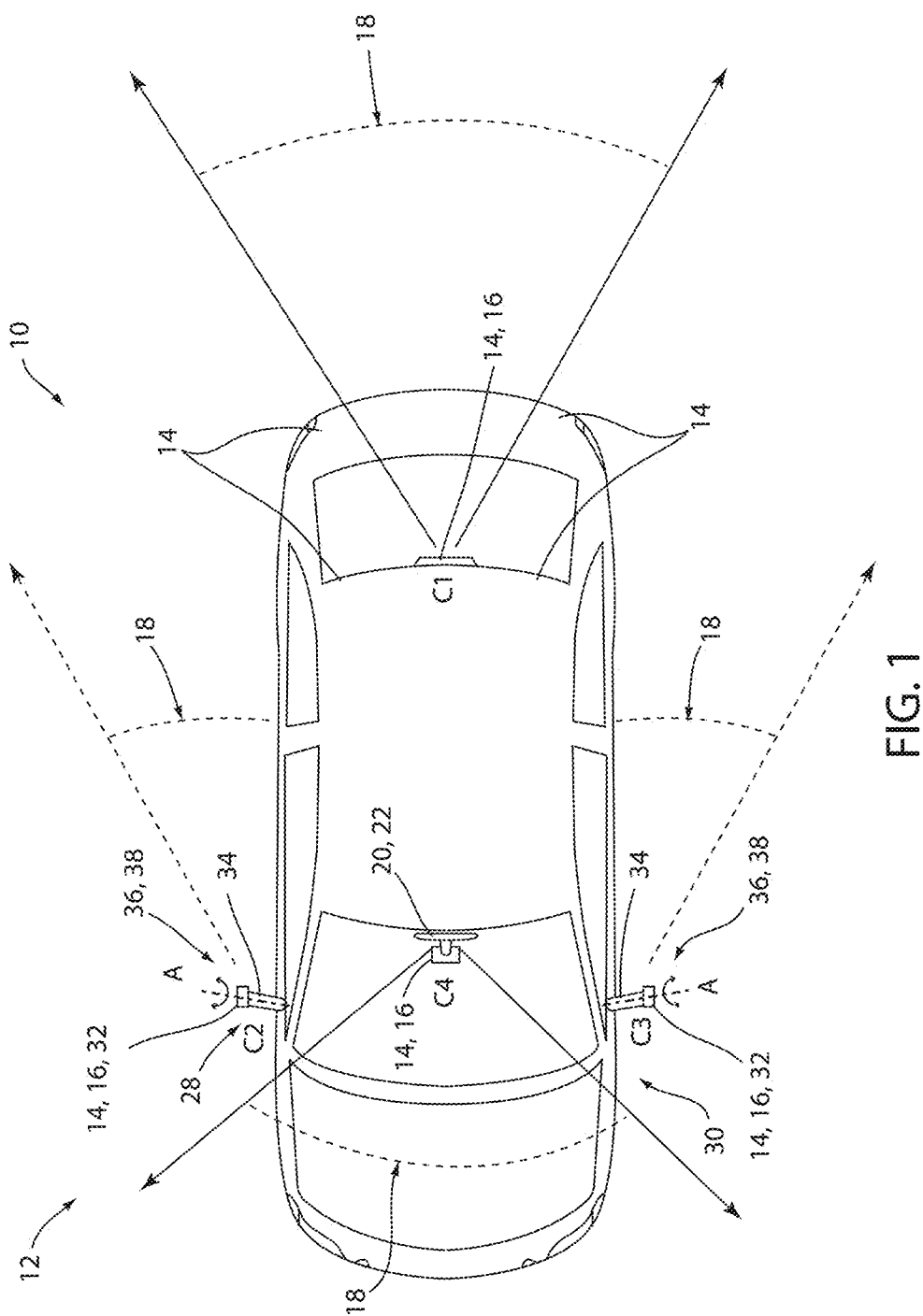
FIG. 1 is an overhead view of a vehicle comprising an imaging system.

FIG. 1 demonstrates an elevational view of a vehicle 10 comprising an imaging system 12. The imaging system 12 may be implemented as an exterior camera monitoring system (CMS) for the vehicle 10. In general, a CMS may be utilized to monitor the surrounding of the vehicle to detect various objects identified in the image data associated with one or more imaging devices 14. For example, the imaging system 12 may be implemented as a component of an advanced driver alert system (ADAS), a security system, a vehicle navigation system, or various other systems that may utilize image data to assist in the operation or security of a vehicle. Accordingly, the imaging system 12 as discussed herein may be implemented to suit a variety of applications.

In some embodiments, the imaging system 12 may comprise a plurality of the imaging devices 14. In some embodiments, the imaging system 12 may comprise a plurality of imaging devices 14 including a first imaging device C1, a second imaging device C2, a third imaging device C3, and a fourth imaging device C4. An image sensor 16 of each of the imaging devices 14 may have a field of view 18 focusing on an environment proximate the vehicle 10. In the various embodiments discussed herein, the imaging devices C1-C4 may be implemented to provide views of the environment proximate the vehicle 10 that may be displayed on the display screen 20 or any form of display device. The display screen 20 may be incorporated in a rearview display 22, positioned similar to a conventional rearview mirror, incorporated in an interior console, or provided in various portions of the vehicle 10.

The imaging devices C1, C2, C3, and C4 may be disposed on the vehicle 10 and oriented such that each field of view 18 of the imaging devices 14 is directed toward a substantially different region. Each of the imaging devices 14 may comprise any form of device configured to capture image data. For example, the imaging devices 14 may be implemented as Charge Coupled Devices (CCD) and Complementary Metal Oxide Semiconductor (CMOS) image sensors.

A first imaging device C1 may be disposed centrally on a rear facing portion of the vehicle 10 proximate a tailgate or similar area of the vehicle 10. In some embodiments, the imaging device C1 may be disposed proximate a rear-bumper and/or a center high mount stop light (CHMSL). A second imaging device C2 and a third imaging device C3 may be disposed on a passenger's side 28 and a driver's side 30 of the vehicle 10, respectively. The second imaging device C2 and the third imaging device C3 may be configured to capture image data corresponding to the environment proximate the side regions of the vehicle 10. The fourth imaging device C4 may be configured to capture image data in a forward direction relative to an operating direction of the vehicle 10. The fourth imaging device C4 may be disposed in a housing of the rearview display 22 or any other portion of the vehicle 10 positioned to capture image data forward of the vehicle 10.

In some implementations, the second imaging device C2 and the third imaging device C3 may be incorporated in side mirrors 32 of the vehicle 10. The imaging devices C2 and C3, in combination with the first imaging device C1, may be configured to capture image data corresponding to a rearward-directed region relative the forward direction of the vehicle 10. In some embodiments, the imaging devices 14 may be configured to capture an increased or decreased viewing angle depending on the particular application. In some embodiments, the imaging devices 14 may be configured to capture approximately the entire environment surrounding the vehicle 10.

In an exemplary embodiment, the side mirrors 32 may be configured to operate as multi-functional elements of the vehicle 10. During operation of the vehicle 10, the image data captured in the fields of view 18 of the image sensors 16 may be displayed on the rearview display 22. Accordingly, during typical operation of the vehicle 10, the visual information reflected by a reflective surface 34 of the side mirrors 32 may be displayed on the rearview display 22 thereby rendering the reflected information provided by the side mirrors 32 redundant. Accordingly, the side mirrors 32 may be configured to function as airfoils 36 or multi-functional modules 38 to improve the aerodynamics of the vehicle 10. In this way, the side mirrors 32 may be utilized in a conventional way in some situations and provide beneficial aerodynamic benefits in other situations.

Figure 2A:
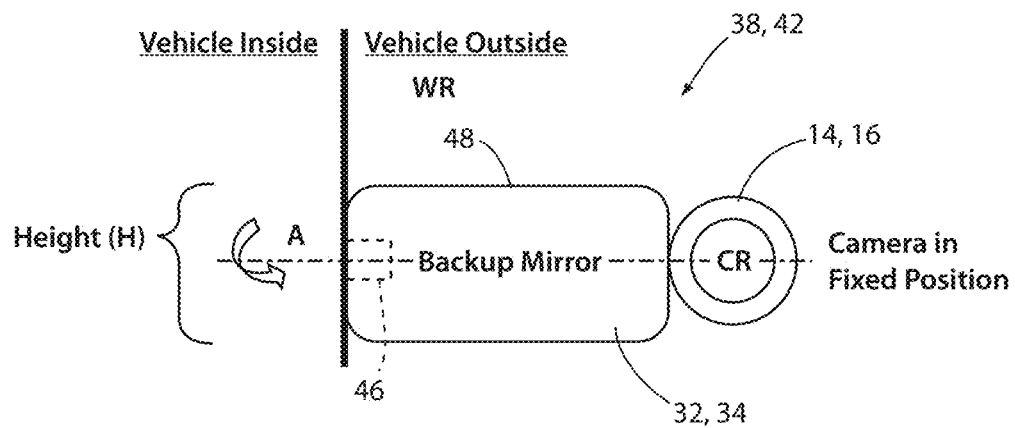
FIG. 2A is schematic view of an exterior mirror comprising an imaging device configured in a first configuration.
Figure 2B:
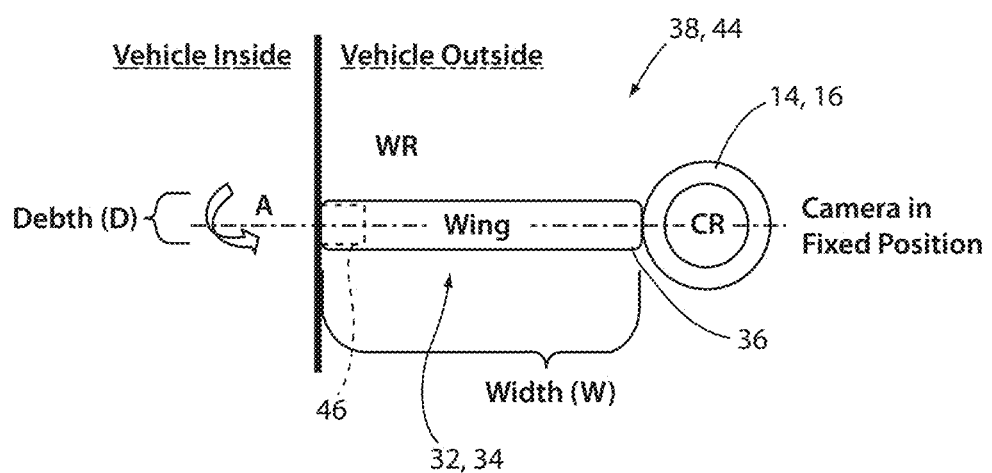
FIG. 2B is schematic view of an exterior mirror comprising an imaging device configured in a second configuration.

FIGS. 2A and 2B demonstrate schematic diagrams of the side mirrors 32 demonstrating a first configuration 42 and a second configuration 44, respectively. Referring now to FIGS. 1, 2A, and 2B, the first configuration may correspond to a conventional arrangement of the modules 38 providing for operation as the side mirrors 32. In the first configuration 42, the modules 38 may be oriented such that the reflective surfaces 34 are configured to reflect light from behind the vehicle 10 toward an operator of the vehicle 10. In the second configuration 44, the modules 38 may be oriented to operate as airfoils 36 or to minimize aerodynamic drag on the vehicle 10. A controller of the imaging system 12 may be configured to control orientation of the modules 38 based on an operating condition of the vehicle 10, operating functionality of the image sensors C2 and C3, and/or based on a user preference. In this way, the imaging system 12 may be configured to selectively adjust a position of the modules 38 to selectively control the modules 38 to be positioned in the first configuration 42, the second configuration 44, or various positions therebetween.

In order to provide for the adjustment of the position or orientation of the modules 38, the system 12 may comprise one or more actuators 46. In some embodiments, the actuators 46 may be configured to rotate the modules 38 about an adjustment axis A as illustrated by the arrows denoted about the axis A. Accordingly, the actuators 46 may be implemented as electric motors, servo-motors, or various forms of actuators that may be operable to adjust or rotate the orientation of the modules 38 about the adjustment axis A. In this way, the controller of the system 12 may selectively adjust the orientation or the modules 38 to suit a desired configuration for the operation of the imaging system 12 and/or to optimize the operation of the vehicle 10.

In order to provide for limited drag or downforce, each of the modules 38 may be incorporated in a housing 48. The housing 48 may extend a width W away from the vehicle 10 along a height H. The housing H may further comprise a depth D extending approximately along a length of the vehicle in the first configuration 42. The depth D may be significantly less than that of conventional side mirrors such that the drag may be minimized arranging the modules 38 in the second position 44. Accordingly, the depth D of the modules 38 may be significantly less than the height H such that the drag may be minimized in the second position 44 relative to the first position 42.

The housing 48 may further be configured to position and support the image sensors 16. The image sensors 16 may be fixed in orientation or configured to rotate independently about the adjustment axis A. For example, the image sensors 16 may be in connection with the vehicle 10 and the housing 48 such that the module 38 and the reflective surface 34 rotate about the adjustment axis A. In some embodiments, the imaging system 12 may be configured to independently rotate the module 38 and the image sensor 16 by implementing a plurality of actuators 46 configured to independently orient the module 38 and the image sensor 16 about the adjustment axis.

In the first configuration 42, module 38 may be rotated about the adjustment axis A such that the reflective surfaces 34 are configured to reflect light from behind or in a rearward direction the vehicle 10 toward the passenger compartment or an operator of the vehicle 10. That is, the reflective surface 34 of the module may be aligned substantially perpendicular to the ground or operating surface supporting the vehicle 10. In this configuration, the module 38 may be arranged such that a reflection from the reflective surface 34 is directed to an operator of the vehicle 10. Accordingly, the first configuration 42 may correspond to a conventional positioning of the module 38 corresponding to the side mirror 32.

In the second configuration 44, the modules 38 may be oriented to operate as airfoils 36 or to minimize drag on the vehicle 10. In this configuration, the controller of the imaging system 12 or another controller (e.g., a dedicated controller in communication with a vehicle bus) may be configured to adjust or rotate the modules 38 about the adjustment axis A such that the mirror surface is directed toward or parallel to the ground or operating surface of the vehicle 10. In this configuration, the height H of the module 38 may be arranged by the controller to be substantially parallel to the ground to a reduce drag associated with the modules 38. Additionally, the depth D of the modules 38 may be arranged perpendicular to the forward operating direction of the vehicle 10. In this configuration, the reduced depth D of the module 38 relative to the height H may limit the drag associated with the module 38. Additionally, in some embodiments, the modules 38 may be rotated between the first configuration 42 and the second configuration 44 to reduce or increase the drag or down force provided by the modules 38.

As discussed herein, the first configuration 42 and the second configuration 44 may vary or be controlled to rotate the side mirror 32 about the adjustment axis A over a range of angles. For example, the side mirrors 32 may be rotated from approximately 60 deg. to 120 deg. or over a user selected range. In an exemplary embodiment, the drag associated with the side mirrors 32 may be decreased at one of more angles about the adjustment axis A relative to the first configuration 42. In this first configuration 44, the mirror 32 may form a first profile shape directed in a forward operating direction of the vehicle 10. In this second configuration 44, the mirror 32 may form a second profile shape directed in the forward operating direction of the vehicle relative to the forward operating direction.

In various implementations, the second profile shape may be approximately 20-90% smaller in a frontal surface area relative to the first profile shape. Accordingly, in some embodiments, the frontal surface area of the mirror 32 may be at least 20%, 30%, 40% or 50% smaller in the second configuration 44 than in the first configuration 42. In some aspects, the frontal surface area of the mirror 32 may be at least 60%, 70%, 80% or provide for an even greater reduction in the frontal surface area in the second configuration 44 relative to the first configuration 42. Additionally based on the angle of rotation about the adjustment axis A, the controller may vary the frontal surface area and/or downforce associated with the mirror 32 or mirror assembly based on a user preference or speed of the vehicle 10. As previously discussed, the frontal surface area may relate to the drag coefficient of the vehicle 10 and is perpendicular to a forward operating direction.

The first configuration 42 may be set and controlled by the controller of the imaging system 12 or a controller in communication therewith in response to an operating condition of the vehicle 10, a user preference, an operating condition of the image sensors 16, and/or an operating condition of the imaging system 12. For example, in some embodiments, the controller may set the modules 38 to the first configuration 42 in response to the vehicle speed being less than a speed threshold. If the speed is less than the speed threshold (e.g., 70 km/h), the controller may control the modules 38 to be arranged in first configuration 42. If the speed is greater than the speed threshold (e.g., 70 km/h), the controller may control the modules 38 to be arranged in second configuration 44. In this way, the controller may adjust the modules 38 to the second configuration 44 in response the vehicle speed increasing. Accordingly, the controller may adjust one or both of the modules 38 to the second configuration 44 to reduce the drag coefficient of the vehicle 10 and the modules 38 as the speed of the vehicle 10 increases or exceeds one or more speed thresholds.

In some embodiments, the controller may also control the configuration of the modules 38 in response to the operation of the image sensors 16, and/or an operating condition of the imaging system 12. For example, if one of the image sensors 16 of the modules 38 is inoperable, the controller may maintain the modules 38 in the first configuration 42. Similarly, if a fault is detected with the imaging system 12, the controller may maintain the modules 38 in the first configuration 42 throughout operation until the fault is resolved. In this way, the controller may ensure that the functionality of the side mirrors 32 is maintained in the event that the image sensors 16 or imaging system 12 experiences a failure.

In some embodiments, the modules 38 may also be controlled by a user input to control the configuration. For example, a user may selectively control the orientation of the modules 38 between the first configuration 42 and the second configuration 44 based on a preference. In this way, the imaging system 12 may provide for flexible operation that can be customized by the operator to maximize efficiency, preferred operation, or a desired appearance. As previously discussed, the image sensors 16 may be fixed in orientation or configured to rotate independently about the adjustment axis A. In this way, the image sensors 16 incorporated with each of the modules 38 may maintain a rearward directed field of view 18 independent of the orientation of the modules 38 in the first configuration 42, the second configuration 44 or in any configuration oriented about the adjustment axis A.

Figure 3:
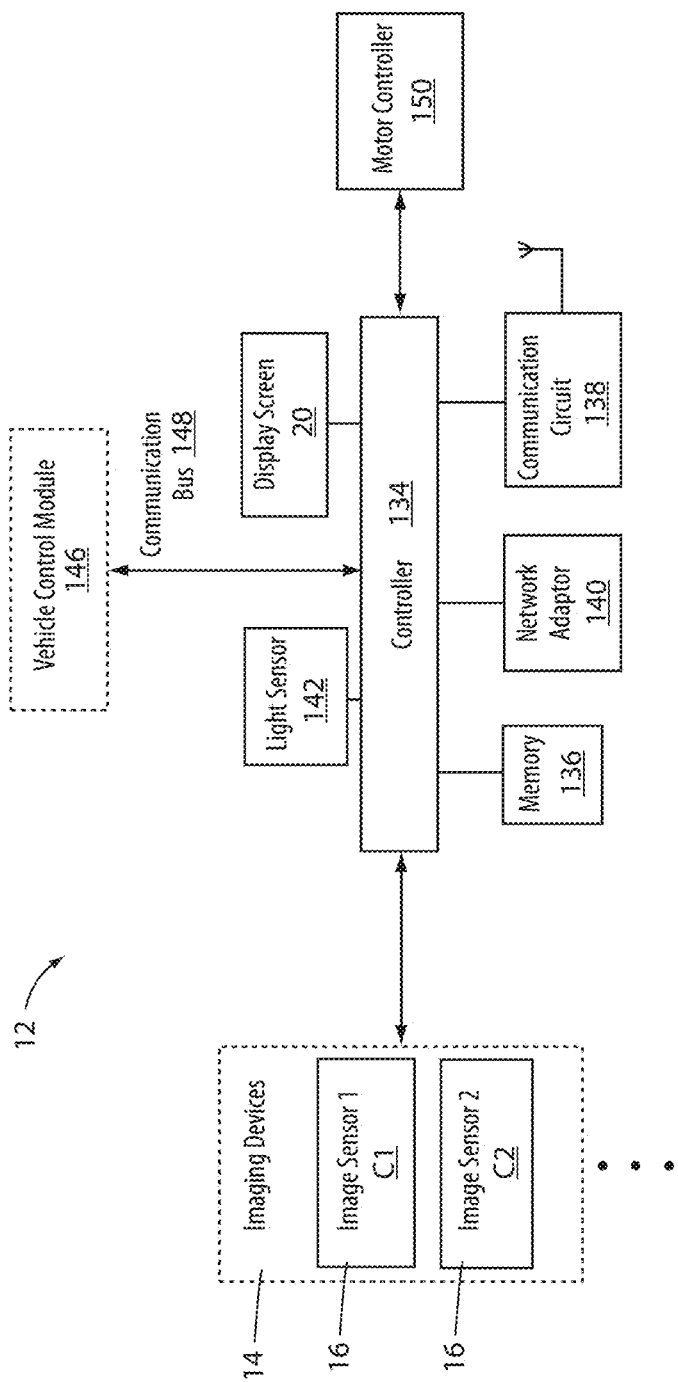
FIG. 3 is a block diagram of an imaging system in accordance with the disclosure.

Referring now to FIG. 3, a block diagram of the imaging system 12 is shown. The imaging system 12 may comprise a display screen 20. The display screen 20 may correspond to the rearview display 22 and may be implemented as a variety of display types. For example, the display screen 20 may correspond to a liquid crystal display (LCD), a plasma display, an organic light emitting diode (OLED) display, a field emission display (FED) panel, or various other displays. The display screen 20 may further incorporate a speaker, haptic feedback device (e.g., vibration motor), LEDs, or various other hardware components for providing an output.

The imaging system 12 may further comprise a controller 134. The controller 134 may include various types of control circuitry, digital and/or analog, and may include a microprocessor, microcontroller, application-specific integrated circuit (ASIC), graphics processing unit (GPU), or other circuitry configured to perform various input/output, control, analysis, and other functions to be described herein. In some embodiments, the controller 134 may be a system on a chip (SoC) individually or with additional hardware components described herein. The controller 134 may include a memory 136 (e.g., random access memory, read-only memory, flash memory, hard disk storage, flash memory storage, solid-state drive memory, etc.). Accordingly, the controller 134 may be operable to control the imaging system 12 including the image sensors 16.

The memory 136 may be used to facilitate the functions of the imaging system 12 as described herein. Memory 136 may include computer code modules, data, computer instructions, or other information, which may be executed by the controller 134 or otherwise facilitate the functions of the imaging system 12 described herein. For example, the memory 136 may include processing instructions, identification information, device registry configurations, image processing and augmentation information, etc. The memory 136 and/or the controller 134 may facilitate the functions described herein using one or more programming techniques, data manipulation techniques, and/or processing techniques, such as using algorithms, routines, lookup tables, arrays, searching, databases, comparisons, instructions, etc.

The imaging system 12 may further comprise a communication circuit 138. The communication circuit 138 may correspond to a transceiver circuit or transmitter circuit coupled to the controller 134. The transceiver circuit may provide for the imaging system 12 to transmit and/or receive wireless communication signals. The wireless communication signals may be transmitted to or received from a variety of wireless devices (e.g., an original transmitter, home electronic device, mobile communications device, and/or remote device). The communication circuit 138 may be controlled by the controller 134. For example, the controller 134 may turn on or off the communication circuit 138, the controller 134 may send data using the communication circuit 138, format information, an activation signal, control signal, and/or other signals or data for transmission via the communication circuit 138, or otherwise control the communication circuit 138. Inputs from the communication circuit 138 may also be received by the controller 134. For example, software configurations, updates, user settings and other information may be received by the communication circuit 138 and stored in the memory 136 by the controller 134.

The controller 134 may be also coupled to a network adapter 140, receivers, and/or transmitters. In some embodiments, the network adapter 140 may be configured to communicate with the imaging devices 14. In some embodiments, the network adapter 140 may be or include a cellular transceiver. In this configuration, the imaging system 12 may use the network adapter 140 and/or an additional transceiver (e.g., a cellular transceiver) to access the internet, other networks, and/or network hardware. In some embodiments, the imaging system 12 may access the internet, other networks, and/or network hardware through an intermediate device in communication with the imaging system 12, such as the mobile device.

In an exemplary embodiment, the network adapter 140 may be configured to send/receive data and/or control signals to a mobile device. The network adapter 140 may communicate via various wireless communication protocols. For example, communication protocols may include, but are not limited to, Bluetooth® (e.g., a Bluetooth® low energy (BLE), Wi-Fi® (IEEE 802.11), ZigBee®, cellular, etc.), a wired interface and/or protocol (e.g., Ethernet, universal serial bus (USB), Firewire®, etc.), or other communication connections (e.g., infrared, optical, ultrasound, etc.).

In some embodiments, the imaging system 12 may comprise an ambient light sensor 142. The ambient light sensor 142 may be configured to identify an operating condition or light level of an operating environment of the imaging system 12. The ambient light sensor 142 may be in communication with the controller 134 and configured to communicate light data indicating an ambient lighting condition proximate the vehicle 10 (e.g., daylight condition, nighttime condition).

The controller 134 may be in communication with a vehicle control module 146 via a communication bus 148 of the vehicle 10. The communication bus 148 may be configured to deliver signals to the controller 134 identifying various states of the vehicle 10. For example, the communication bus 148 may be configured to communicate an operating condition of the vehicle 10 (e.g., the ignition is active, a gear selection, a lighting activation or setting, etc.), an ambient light level, a seat occupancy, a door ajar signal, driver/occupant identity or any other information or control signals that may be communicated via the communication bus 148. In this way, the controller 134 may communicate with the vehicle control module 146 to identify a variety of conditions and/or settings of the vehicle 10.

Additionally, the controller 134 may be in communication with a motor controller 150. The motor controller 150 may be configured to the actuators 46 or motors configured to control a position or orientation of the modules 38 about the adjustment axis A. As discussed herein, the motors or actuators 46 configured to position or orient the modules 38 may correspond to various types of devices including, but not limited to, stepper motors, servo motors, rotational actuators, etc.

The following references may include various implementations for imager systems providing rearward facing panoramic views and are incorporated herein by reference in their entirety: U.S. Pat. No. 8,237,909 B2, entitled "VEHICLE REARVIEW MIRROR ASSEMBLY INCLUDING INTEGRATED BACKLIGHTING FOR A LIQUID CRYSTAL DISPLAY (LCD), filed Feb. 6, 2009, by John B. Ostreko et al.; and U.S. Pat. No. 8,411,245, entitled "MULTI-DISPLAY MIRROR SYSTEM AND METHOD FOR EXPANDED VIEW AROUND A VEHICLE," filed Sep. 30, 2009, by Ethan J. Lee et al. Though the imaging system 12 in the various implementations disclosed herein is shown incorporated in a rearview display system, a display may similarly be incorporated in a vehicle forward center console, as a heads-up display, or in any other location that may be visible to an operator or occupant of a vehicle.

It will be understood by one having ordinary skill in the art that construction of the described invention and other components is not limited to any specific material. Other exemplary embodiments of the invention disclosed herein may be formed from a wide variety of materials unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the invention as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present invention. The exemplary structures and processes disclosed herein are for illustrative purposes and are not to be construed as limiting.

It is also to be understood that variations and modifications can be made on the aforementioned structures and methods without departing from the concepts of the present invention, and further it is to be understood that such concepts are intended to be covered by the following claims unless these claims by their language expressly state otherwise.

What is claimed is:

1. An exterior mirror module for a vehicle comprising:
   an image sensor configured to capture image data;
   a reflective element disposed on a first side portion;
   a housing configured to support the reflective element and the image sensor in connection with the vehicle;
   an actuator configured to adjust an orientation of the reflective element about an adjustment axis; and
   a controller in communication with the image sensor and the actuator, wherein the controller is configured to control the actuator to adjust an orientation of the reflective element about the adjustment axis between a first orientation and a second orientation, wherein the first orientation comprises a reflective surface of the reflective element orientated such that light received from a rearward direction of the vehicle is reflected into a passenger compartment of the vehicle and the second orientation comprises the reflective surface of the reflective element directed toward at least one of an opening surface of the vehicle and a skyward direction normal to the operating surface.

2. The module according to claim 1, wherein the housing comprises a height corresponding to the reflective element, a width extending away from the vehicle, and a depth.

3. The module according to claim 2, wherein the adjustment axis extends substantially along the width of the housing.

4. The module according to claim 2, wherein the controller is configured to adjust an orientation of the housing and the reflective element such that the height and depth of the housing are rotated about the adjustment axis.

5. The module according to claim 1, wherein the actuator is configured to adjust the orientation of the reflective element while maintaining an orientation of the image sensor.

6. The module according to claim 1, wherein the adjustment of the orientation of the reflective element comprises a rotation of at least 60 degrees about the adjustment axis.

7. The module according to claim 1, wherein the first orientation forms a first profile shape directed in a forward operating direction of the vehicle and the second orientation forms a second profile shape directed in the forward operating direction of the vehicle relative to the forward operating direction.

8. The module according to claim 7, wherein the second profile shape is at least 20% smaller in a frontal surface area relative to the first profile shape, wherein the frontal surface area is perpendicular to a forward operating direction.

9. The module according to claim 7, wherein the second profile shape is at least 40% smaller in a frontal surface area relative to the first profile shape, wherein the frontal surface area is perpendicular to a forward operating direction.

10. A method for controlling an exterior mirror assembly for a vehicle, the method comprising:
    orienting the mirror assembly in a first orientation about an adjustment axis;
    exposing a first surface of the mirror assembly in an airflow direction generated by a forward motion of the vehicle;
    controlling a rotation of the mirror assembly by at least 60 degrees about the adjustment axis in a second orientation; and
    exposing a second surface of the mirror assembly in the airflow direction generated by the forward motion, wherein the second surface comprises a frontal area at least 10 percent smaller than the first surface, wherein the controlling the rotation of the mirror assembly rotates the first surface from a frontal surface of the vehicle in the first orientation presenting the second surface as the frontal surface of the vehicle in the second orientation.

11. The method according to claim 10, further comprising:
    maintaining an orientation of a camera in connection with the mirror assembly in a fixed orientation while the mirror assembly is rotated.

12. The method according to claim 11, further comprising:
    displaying image data captured in a rearward directed field of view via the camera on a display in the vehicle.

13. The method according to claim 10, further comprising:
    wherein the controlling the rotation of the mirror assembly is configured to reduce the frontal area of the vehicle.

14. The method according to claim 10, wherein the first orientation comprises a reflective surface of the mirror assembly oriented such that light received from a rearward direction of the vehicle is reflected into a passenger compartment of the vehicle.

15. The method according to claim 10, wherein the second orientation comprises the reflective surface directed toward at least one of an operating surface of the vehicle and a skyward direction normal to the operating surface.

16. An exterior mirror module for a vehicle comprising:
    an image sensor configured to capture image data;
    a mirror assembly comprising a housing configured to support a reflective element and the image sensor;
    an actuator configured to adjust an orientation of the mirror assembly relative to the vehicle about an adjustment axis; and
    a controller in communication with the image sensor and the actuator, wherein the controller is configured to control the actuator to adjust an orientation of the reflective element about the adjustment axis from a first orientation to a second orientation, wherein the first orientation comprises a first surface of the mirror assembly oriented as a frontal surface relative to a forward operation of the vehicle and the second orientation comprises a second surface of the mirror assembly oriented as the frontal surface, wherein the second surface comprises a reduced drag coefficient relative to the first surface.

* * * * *